United States Patent [19]

Lemercier

[11] 3,945,887
[45] Mar. 23, 1976

[54] HEAT-INSULATING LINING FOR A FAST REACTOR

[75] Inventor: Guy Lemercier, Le-Puy-Sainte-Reparade, France

[73] Assignee: Commissariat a l'Energie Atomique, Paris, France

[22] Filed: June 12, 1974

[21] Appl. No.: 478,705

[30] Foreign Application Priority Data
June 26, 1973 France .............................. 73.23338

[52] U.S. Cl. .............................. 176/87; 176/DIG. 2
[51] Int. Cl.² ......................................... G21C 11/08
[58] Field of Search ......................... 176/87, DIG. 2

[56] References Cited
UNITED STATES PATENTS

| | | | |
|---|---|---|---|
| 3,488,255 | 1/1970 | Hayden et al. ..................... | 176/87 X |
| 3,548,931 | 12/1970 | Germer et al. ..................... | 176/87 X |
| 3,847,733 | 11/1974 | Ventre .............................. | 176/87 X |

Primary Examiner—Stephen C. Bentley
Assistant Examiner—P. A. Nelson
Attorney, Agent, or Firm—Cameron, Kerkam, Sutton, Stowell & Stowell

[57] ABSTRACT

A heat-insulating lining for a fast reactor shield slab comprises a set of panels each consisting of a mat of superposed wire mesh or fabric elements enclosed within at least one metallic casing which is secured against the shield slab. The end walls of the casing are formed by sealing plates applied against the panels and the side walls are formed by at least two interengaged L-section members so arranged that one flange of each member covers the edge of one sealing plate whilst the other two flanges leave a narrow lateral gap which forms a capillary seal.

8 Claims, 3 Drawing Figures

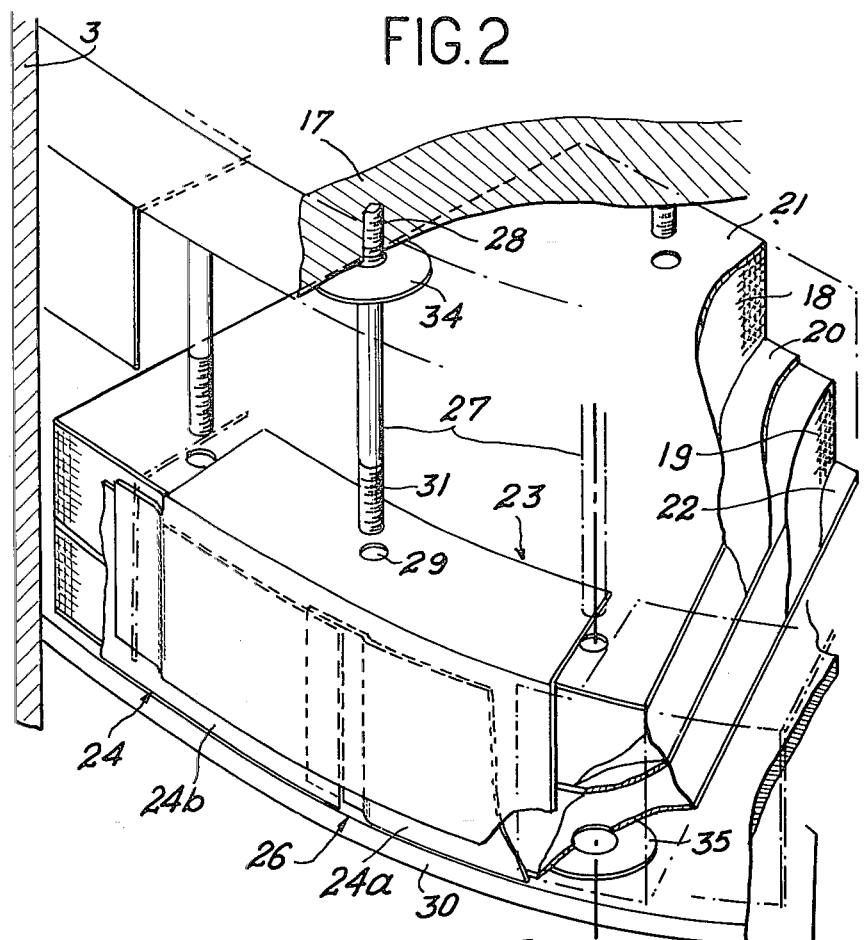
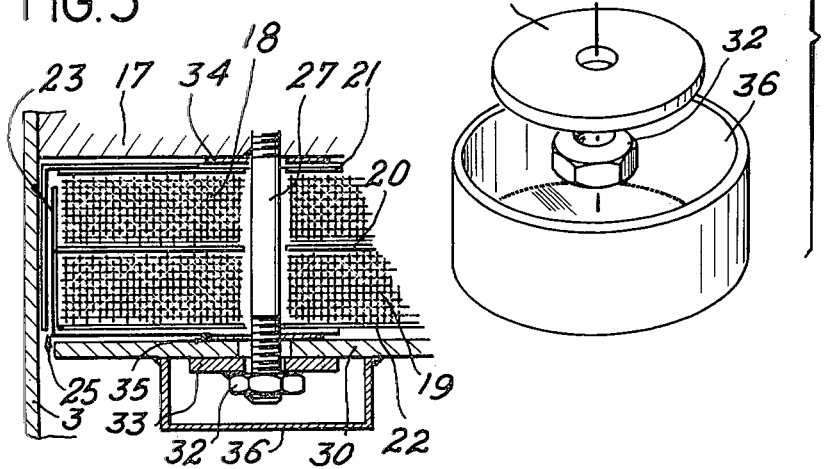

HEAT-INSULATING LINING FOR A FAST REACTOR

This invention relates to a heat-insulating lining which is primarily intended to be employed in a fast reactor for ensuring thermal protection of a shield slab which serves to close the top portion of the biological shield structure of a reactor of this type. The shield structure in turn encloses an open-topped metallic tank having a vertical axis and containing a mass of liquid metal which usually consists of sodium for cooling the reactor core by removal of the heat generated by nuclear fission. The invention applies more especially in the case in which the closure or shield slab located above the free level of the liquid metal within the tank is separated from this latter soley by a layer of inert blanket gas which usually consists of argon, the shield slab being constituted by a horizontal concrete wall, the wall surface which is in contact with said blanket gas being covered with a metallic sole-plate of stainless steel. Said shield slab also has openings which allow access by handling equipment units to the reactor core within the biological shield structure and at the same time provide a sealed passageway for components such as heat exchangers and pumps which are necessary for the operation of the installation.

In sodium-cooled fast reactors, it is also known that the temperature in the inert-gas atmosphere which is present above the level of the liquid metal is usually of the order of 500°C. This gives rise to the formation in the blanket gas of sodium vapors and aerosols which would be liable to come into contact with the sole-plate of the shield slab if no precaution were taken and thus to cause rapid damage to the sole-plate on the one hand as a result of corrosion effects and on the other hand as a result of mechanical stresses arising from differential thermal expansions.

The invention relates to a heat-insulating lining which is adapted to the operating conditions outlined in the foregoing and is consequently capable of ensuring thermal protection of the shield slab, provision being made in particular for metallic structural elements which are incorporated with said lining and afford resistance to corrosion by liquid metal, with the exception of mineral heat-insulating materials which are incompatible with sodium vapors and aerosols. Said metallic structural elements are preferably provided in the form of wire fabric, trelliswork or netting and are stacked so as to form aerated panels of predetermined thickness which are comparable with a fibrous medium, thereby producing between the sole-plate of the shield slab and the blanket gas located above the level of liquid metal an acceptable thermal gradient which is adapted to the possible power levels of the reactor both under normal operating conditions and in the event of a fault condition in the circulating pumps accompanied by an abrupt temperature rise.

To this end, the heat-insulating lining under consideration which comprises a set of panels each constituted by a mat of superposed elements of metallic fabric or trelliswork extending parallel to the shield slab to be heat-insulated, is distinguished by the fact that the set of panels is enclosed within at least one metallic casing fixed against the shield slab and such that the end walls of said casing which are parallel to the panels are formed by sealing plates applied against said panels, the sides of the casing which connect the sealing plates to each other being constituted by at least two interengaged L-section members having two flanges at right angles, one flange of each L-section member being adapted to cover one sealing plate whilst the other two flanges delimit therebetween a narrow lateral gap forming a capillary seal.

In its application which is more particularly contemplated, the heat-insulating lining under consideration is applied against the shield slab which closes the biological shield structure of the reactor so that one of the sealing plates which is in contact with the shield slab is at a relatively low temperature and the other sealing plate which is in contact with the blanket gas is at the high temperature of this latter. The thermal gradient created across the lining by the metallic fabric or trelliswork panels ensures condensation of the aerosols of liquid metal within the capillary space delimited by the two lateral L-section members, with the resultant formation of an annular band of solidified metal which achieves imperviousness of the casing to outside agents. As a consequence, the vapors and aerosols of liquid metal cannot penetrate into the casing or consequently cause progressive clogging of the interstices between the meshes of the metallic fabric elements which would rapidly limit the thermal efficiency of the lining. Under these conditions and in accordance with a particular feature of the invention, the capillary gap opens towards the exterior of the casing and preferably into the layer of blanket gas located above the level of liquid metal within the tank, therefore in the vicinity of the "hot" sealing plate of the lining in contradistinction to the "cold" plate which is applied against the sole-plate of the shield slab.

In accordance with one particular form of construction of the heat-insulating lining which is primarily intended to permit adaptation of said lining to surfaces of shield slabs having large dimensions or having complex geometrical profiles, the L-section members of the casing are formed by means of a plurality of unitary L-section members, each unitary member being provided at one end with a flat stepped portion which permits successive overlapping of said members without any break in continuity. Moreover, depending on the thermal gradient to be established across the lining under the conditions of operation, a plurality of superposed panels are enclosed in the casing and separated by flat intermediate sheet-metal elements which are parallel to the sealing plates.

In accordance with another feature of the invention, the L-section members, the sealing plates and the intermediate sheet-metal elements are assembled together with the panels of metallic fabric or trelliswork by means of fixing studs carried by the shield slab and extending at right angles to this latter, supporting of the casing being effected by means of nuts screwed on threaded ends of said studs and applied against a metallic support and protection wall mounted beneath the casing. Locking of the nuts against the metallic support wall is preferably carried out with interposition of a bearing washer applied by tightening of the nuts. In addition and in order to limit heat conduction between the metallic support wall and the shield slab across the casing, the fixing studs are either made of material having low heat conductivity or provided with an internal bore filled with inert gas which is similar to the blanket gas. Finally and in accordance with a characteristic feature, each nut which is screwed on the end of a stud is surrounded by a leak-tight end-cap which is welded to the metallic support wall.

Further properties of a heat-insulating lining as constructed in accordance with the invention will become apparent from the following description of one example of construction which is given by way of indication without any limitation being implied, reference being made to the accompanying drawings in which:

FIG. 2 is an exploded view to a larger scale showing part of the heat-insulating lining under consideration;

FIG. 3 is a transverse sectional view of the lining in accordance with FIG. 2.

Figure 1:
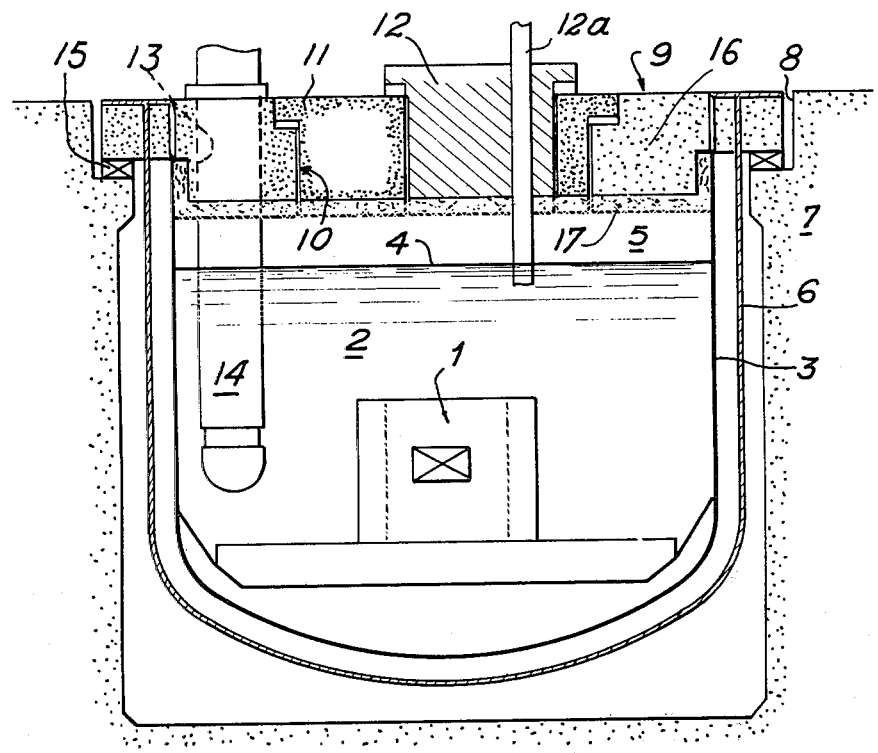
FIG. 1 is a diagrammatic axial sectional view of a fast reactor comprising a top closure or shield slab fitted with a heat-insulating lining in accordance with the invention.

In FIG. 1, the reference numeral 1 designates the core of a fast reactor which is represented as being immersed in a suitable mass 2 of liquid metal and especially liquid sodium which has the intended function of cooling the reactor core during operation at power. The liquid metal 2 is confined within an open tank 3 up the level shown diagrammatically at 4 and an atmosphere 5 of inert blanket gas usually consisting of argon is present above said level 4. The tank 3 is open at the top and in turn surrounded by a second tank or safety tank 6, the unit consisting of both tanks with a common vertical axis being placed within an external biological shield structure 7. Provision is made at the top of said shield structure for a wide circular opening 8 in which is mounted a closure or shield slab 9. Said slab extends horizontally and parallel to the level 4 of liquid sodium within the tank 3 and has a central opening 10 for positioning a system consisting of two shield plugs 11 and 12 which make it possible as a result of combined relative movements of rotation in accordance with a conventional procedure to provide access to the reactor core 1 for a handling tool 12a which passes in leak-tight manner through one of the shield plugs. The shield slab 9 is also provided with further passageways such as 13 in order to mount in these latter the equipment units which are necessary for operation of the reactor and in particular for circulation of the liquid sodium and removal of the heat which is collected as the sodium flows through the reactor core. The equipment units consist especially of pumps and heat exchangers, one of which is represented schematically at 14 in the drawing. The shield slab 9 is supported on a corbel formed in the biological shield structure 7 by a bearing element 15 which ensures immobilization and leak-tightness of the assembly. Finally, the shield slab 9 has preferably a composite structure consisting mainly of a concrete wall 16 of substantial thickness, the slab surface which is directed towards the level 4 of liquid metal within the tank 3 being lined with a sole-plate 17. By virtue of the presence of the heat-insulating material, said sole-plate 17 can be formed of black steel protected by a corrosion-resistant deposit. During operation, the atmosphere of the inert gas which is present above the liquid sodium within the tank 3 is at a pressure in the vicinity of atmospheric pressure and is brought to a relatively high temperature of the order of 500°C. Under these conditions, this atmosphere is charged with liquid-metal aerosols or vapors which, if no precaution is taken, are liable to cause rapid corrosion of the sole-plate 17 at the same time as the deformation of this latter under the action of mechanical stresses resulting from differential thermal expansions.

Under these conditions, in order to ensure thermal protection of the shield slab 9 and in particular of its bottom sole-plate 17, provision is made in accordance with the invention for a heat-insulating lining as shown in greater constructional detail in FIGS. 2 and 3, said lining being placed against that face of the sole-plate which is directed towards the level 4 of liquid metal and in contact with the blanket gas.

As can be seen from these figures, the heat-insulating lining which is proposed is mainly composed of superposed panels such as those designated by the references 18 and 19 and formed by means of a stack of suitable wire-fabric, wire-trelliswork or wire-netting elements. The characteristics of these wire-fabric or trelliswork elements are chosen as a function of the values of thermal flux to be withstood irrespective of the reactor power level. In particular, the fabric elements referred-to above can be formed by means of wires having a diameter of 0.4 mm, the mesh structure of said wire-fabric elements being such as to correspond to a uniform square lattice having a pitch of 4 mm. The panels 18 and 19 thus formed are separated by an intermediate sheet-metal element 20 having a small thickness of the order of 0.2 mm and are placed together within the interior of a closed semi-impervious casing.

Said casing is made up of two sealing plates 21 and 22 respectively which extend parallel to the corresponding face of the sole-plate 17, said sealing plates being applied against the opposite surfaces of the panels 18 and 19. The plates 21 and 22 are additionally covered along the lateral edges of the casing by L-section members designated by the references 23 and 24 respectively and each having two flanges bent at right angles to each other, one of which is applied against the corresponding sealing plate 21 or 22 whilst the two other flanges of the two L-section members are parallel to each other so as to delimit therebetween a narrow gap 25 which forms a capillary seal with respect to the external blanket gas 5.

If the shield slab to be heat-insulated has a substantial surface area, each L-section member 23 or 24 is preferably formed by means of a series of unitary L-section members which are capable of interengagement so as to overlap each other in pairs, each L-section member being accordingly provided at one end with a flat stepped portion 26 shown in FIG. 2 between two successive L-section members 24a and 24b, said stepped portion 26 of one of the unitary L-section members 24a being covered by the corresponding portion of the following unitary member 24b.

The complete unit formed by the panels 18 and 19 of wire-fabric elements, the intermediate sheet-metal element 20, the sealing plates 21 and 22 and the L-section members 23 and 24 is assembled together and then applied against the sole-plate 17 by means of fixing studs 27, one extremity 28 of each stud being screwed directly into the sole-plate. Said studs 27 traverse the heat-insulating lining through vertical bores 29, then through a metallic support and protection wall 30, the design function of which will be explained in greater detail hereinafter. The extremity 31 of the stud 27 is also threaded so as to cooperate with a locking-nut 32 which serves to apply a bearing flange 33 against the wall 30 as a result of tightening of said nut and serves at the same time to clamp the panels 18 and 19 between the sealing plates 21 and 22 and the L-section members 23 and 24, the complete assembly being thus rigidly fixed beneath the sole-plate 17. As an advantageous feature, washers 34 and 35 are mounted on each stud 27 against the plates 21 and 22 in order to maintain leak-tightness of the casing; finally, the end portions of the studs 27 on which the nuts 32 are screwed are protected by external end-caps 36 which are welded beneath the metallic wall 30. It should be noted that said wall can be formed in a number of adjacent portions separated by slits or openings which permit relative movements of expansion, said portions being joined to each other by means of the bearing flanges 33 which are partially welded to the corresponding adjacent portions while permitting relative sliding motion of these latter.

The narrow gap 25 which forms a capillary seal between the vertical edges of the lateral L-section members 23 and 24 thus makes it possible at the time of operation of the reactor to trap the sodium vapors and aerosols which are prevented from migrating towards the center of the panels 18 or 19 by the liquid layer or the solid band formed within said gap which is open towards the blanket gas. In consequence, the casing of the lining remains leak-tight and the characteristics of the panels are not modified. The aerated structure of said panels endows these latter with a very low coefficient of thermal conduction, thereby providing the sole-plate of the shield slab with suitable protection with respect to the temperature existing within the interior of the tank above the level of liquid metal. It should be noted, however, that the studs which serve to secure the lining beneath the shield slab are liable to create thermal bridges between the hot face of the heat-insulating material within the metallic support and protection wall and the cold face constituted by the sole-plate of the shield slab iself. In order to limit these thermal bridges, various solutions of an essentially conventional type can be employed with a view to reducing the thermal conductivity of the studs either by making a suitable choice of the material constituting the studs or by forming an axial bore within said studs so as to delimit within these latter a closed cavity filled with an inert gas which is usually identical with the blanket gas. It should also be pointed out that the presence of the protective end-caps around the heads of the studs makes it possible to limit heat build-up to an appreciable extent. At the same time, said end-caps ensure safety in the event of failure of one of the studs by preventing this latter from falling together with its fixing nut into the liquid metal contained in the tank.

It is readily apparent that the external profile of the casings containing the heat-insulating panels which are applied against the sole-plate of the shield slab can easily be adapted to the shape of said sole-plate, especially when this latter has portions which are not only horizontal but also vertical, in particular through the openings formed in said shield slab. The casings containing the metallic panels can in fact cover the sole-plate irrespective of its orientation with respect to the level of liquid metal and can be fixed against the corresponding wall either by mechanical fastening means or by direct welding or finally by mounting on support shells combined with liquid metal seals for ensuring leak-tightness between said shells and the wall of the sole-plate. Finally, in order to limit the thermal gradient across the heat-insulating lining still further, it can be advantage to place beneath the metallic support and protection wall either one or a number of thermal baffles supported by studs or the like so as to attach them beneath said wall or directly beneath the protective end-caps which are welded to this latter.

It must therefore be understood that the invention is not limited to the example of construction which has been more especially described with reference to the accompanying drawings but extends on the contrary to all alternative forms.

What we claim is:

1. In a fast nuclear reactor, a heat-insulating lining for a shield slab which serves to close the biological shield structure of said fast reactor comprising an open tank mounted within the shield structure and containing the reactor core immersed in a mass of liquid-metal coolant and a layer of inert blanket gas which is present above said coolant, said heat-insulating lining being comprising a set of panels each constituted by a mat of superposed elements of metallic fabric or trelliswork extending parallel to the shield slab to be heat-insulated, wherein the set of panels is enclosed within at least one metallic casing fixed against the shield slab and so arranged that the end walls of said casing which are parallel to the panels are formed by sealing plates applied against said panels, the sides of the casing which connect the sealing plates to each other being constituted by at least two interengaged L-section members having two flanges at right angles, one flange of each member being adapted to cover one sealing plate whilst the other two flanges delimit therebetween a narrow lateral gap forming a capillary seal.

2. A heat-insulating lining according to claim 1, wherein the lateral gap between the edges of the two L-section members opens towards the exterior of the casing into the layer of blanket gas.

3. A heat-insulating lining according to claim 1, wherein the L-section members of the casing are formed by means of a plurality of unitary L-section members, each unitary member being provided at one end with a flat stepped portion which permits successive overlapping of said members without any break in continuity.

4. A heat-insulating lining according to claim 1, wherein the casing encloses a plurality of superposed panels separated by intermediate flat sheet-metal elements which are parallel to the sealing plates.

5. A heat-insulating lining according to claim 1 and claim 4, wherein the L-section members, the sealing plates and the intermediate sheet-metal elements are assembled together with the panels of metallic fabric or trelliswork by means of fixing studs carried by the shield slab and extending at right angles thereto, supporting of the casing being effected by means of nuts screwed on a threaded end of said studs and applied against a metallic support and protection wall mounted beneath the casing.

6. A heat-insulating lining according to claim 5, wherein locking of the nuts against the metallic support wall is carried out with interposition of a bearing washer applied by tightening of the nuts.

7. A heat-insulating lining according to claim 5, wherein the fixing studs are either made of material having low heat conductivity or provided with an internal bore filled with inert gas which is similar to the blanket gas.

8. A heat-insulating lining according to claim 5, wherein each nut which is screwed on the end of a stud is surrounded by a leak-tight end-cap which is welded to the metallic support wall.

\* \* \* \* \*